Oct. 28, 1958 G. A. TOUVET 2,858,421

LIGHT COMMUNICATION SYSTEM

Filed Jan. 15, 1951 5 Sheets-Sheet 1

INVENTOR
GUY A. TOUVET,

BY

B. L. Zangwill
ATTORNEY

Oct. 28, 1958 G. A. TOUVET 2,858,421
LIGHT COMMUNICATION SYSTEM
Filed Jan. 15, 1951 5 Sheets-Sheet 2
Fig. 2.
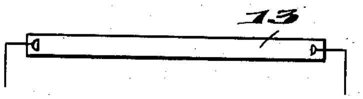
Fig. 3.
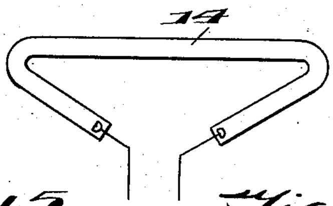
Fig. 4.
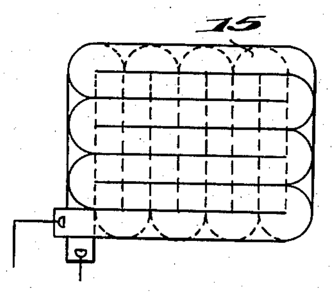
Fig. 5.
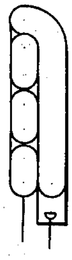
Fig. 6.
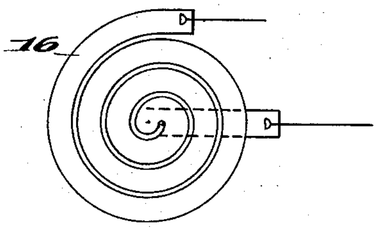
Fig. 7.
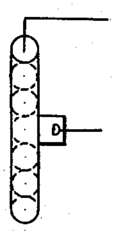
Fig. 8.
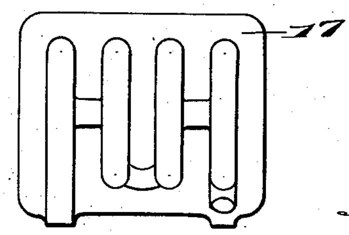
Fig. 9.
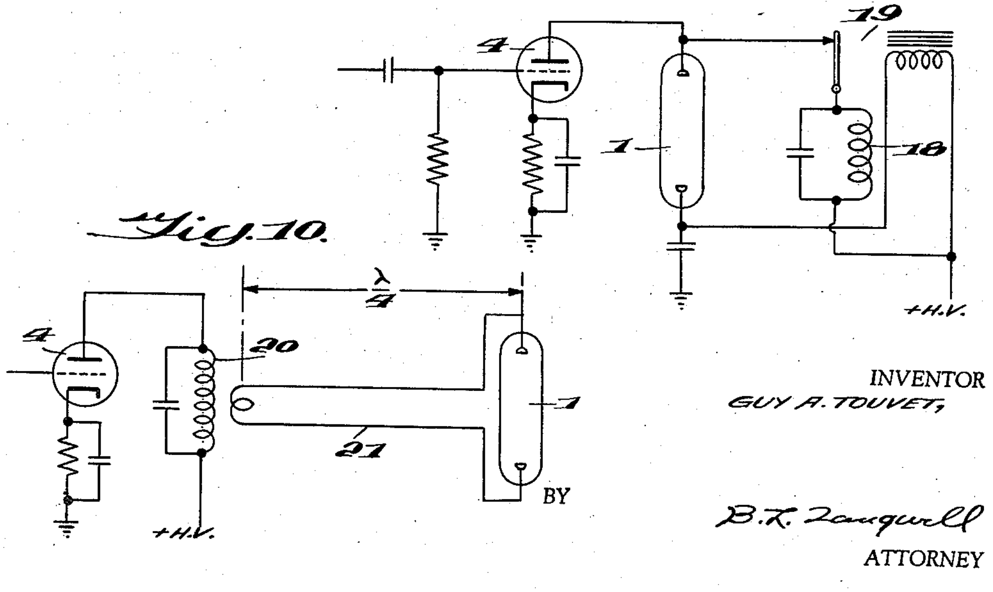
Fig. 9. Fig. 10.
INVENTOR
GUY A. TOUVET,
BY
B. K. Zanquell
ATTORNEY

INVENTOR
GUY A. TOUVET,

BY

B. L. Zangwill
ATTORNEY

Oct. 28, 1958 G. A. TOUVET 2,858,421

LIGHT COMMUNICATION SYSTEM

Filed Jan. 15, 1951 5 Sheets-Sheet 4

INVENTOR
GUY A. TOUVET,

BY

B. L. Zangwill
ATTORNEY

INVENTOR
GUY A. TOUVET,

BY

B. L. Zangwill
ATTORNEY 2,858,421

LIGHT COMMUNICATION SYSTEM

Guy Achille Touvet, Orleans, France

Application January 15, 1951, Serial No. 206,001
6 Claims. (Cl. 250—7)

This application is a continuation-in-part of application, Serial No. 645,626 filed Feb. 5, 1946, now Patent No. 2,538,062 for Light Communication System.

This invention relates to communication and radar systems; and in particular to light radiation transmitters and receivers which are operated so as to achieve military security as well as reliable communication, radar location, remote control or television. The general system can use light radiation of any wave length or from the whole spectrum as desired, but infrared or ultraviolet radiation is more useful in "blackout" communications for military security and for reliability in foggy weather.

It is well known in electronics engineering to utilize the radiation from various gases and vapors in discharge tubes as a carrier, with the direct current that excites the tube modulated by an audio voltage or telegraphic impulses. Because of the general distribution of this radiant energy in spectral lines from infrared to ultraviolet, only a small portion is usable in infrared or "blackout" transmission. The rest is lost in filters which must be very opaque to all but infrared if secrecy is to be maintained. An effective filter is usually somewhat opaque to the infrared as well, so a further loss occurs. The gas tubes commonly used are limited to small power and to current densities whose peaks are considerably less than 100 amperes per sq. cm., if favorable tube life is expected. Thus only a limited transmission range has been obtainable. Tube electrodes may be heated by a filament or self-heated by the tube current.

Further, light modulation with the audio or telegraphic voltage directly does not present electronic security because any audio frequency receiver which can pick up a usable input signal will give the modulation signal as its output.

In contrast, the light modulation system of this invention utilizes radio-frequency current, or very high amplitude D.-C. pulses of short duration which are rich in radio frequency transients, for excitation of a light source to achieve markedly better results. Naturally, known steps are taken to avoid any radio-electric radiation into space. When the light source is one or more of the rare gases such as xenon, helium, neon, or krypton at low pressure in an electrical discharge tube, R. F. excitation causes an increase in radiation in some particular portion of the spectrum, depending on the gas and frequency in use; broadens the line spectrum into a band spectrum; enhances the radiation of lines which are of very low amplitude with conventional excitation; and permits greater current densities in the tube with the resulting increased light power output and without distortion or overloading of the modulation.

The increase in radiation in some particular portion of the spectrum corresponds generally to a redistribution of energy in the spectrum.

Certain metallic vapors may also be used, for instance caesium, in transmitting infrared. If mercury vapor is used, transmission will be in the ultraviolet region.

Pulsed operation at very high levels causes the increase in light output to exceed the increase expected from a given current increase, if any. This may be due to increased gas tube efficiency at high current levels.

Thus higher densities of current and large increases of light power output are achieved without distortion or overloading and with increased reliability and transmission range.

When xenon gas is used in a tube with R. F. excitation, a redistribution of radiant energy into the infrared region is particularly evident. The spectral lines of the infrared portion of xenon's spectrum are increased in amplitude and broadened into bands, concentrating a greater portion of the radiant energy in the infrared region. Filtering for "blackout" operation is much easier with this rich source of infrared radiation. Such a tube has also the special advantage of permitting an easy modulation of the infrared output at radio frequency and consequently has all the advantages inherent therein.

The radio-frequencies at which the light output is generated are determined by the condition of the power amplifier, in class A, B, or C; and by the plate circuit of the power amplifier, i. e., whether a tuned circuit is used with the gas tube or not. With class A operation and only the gas tube in the plate circuit, the light output will be at the same frequency as the driving power applied to the amplifier's grid. This frequency is hereafter known as F. With class A operation and a tuned circuit across the gas tube, tuned to F, the resonant circuit causes an opposite voltage swing on alternate half-cycles. As this causes the current to go through zero as the voltage reverses, the light output has a double peak each cycle. Since the gas tube is a heavy load on the tuned circuit, these opposite voltage swings are damped to an amplitude lower than the swing when plate current rises. Under these conditions the light output will have an appreciable percentage of second harmonic, 2F. If the gas tube is tapped down on the tank coil of the power amplifier, it does not load the circuit as much and the reverse swings are almost equal to the swings caused by surges of plate current. Under these conditions, the light output is predominantly 2F. With class B operation, where a tuned circuit is used as above described, the light output is the same as for class A operation. With class B operation with only a gas tube in the plate circuit of the power amplifier, the light output occurs only during alternate half cycles when plate current flows. This discontinuity of light output causes components of F, 2F, 3F, etc., to be present. With class C operation with only a gas tube in the plate circuit, the pulses in alternate half cycles are shorter than 180 electrical degrees and therefor the light output is again F with considerable component percentages of 2F, 3F, etc., adding a tuned circuit would decrease higher order harmonics but increase 2F, due to the reverse swing of the tank voltage.

The light from this R. F. excited source may be received in a conventional receiver consisting of a photocell and audio amplifier, if the radio-frequency is single carrier, amplitude modulated, but the radio-frequency is single carrier, amplitude modulated, but the radio-frequency excitation can, if desired, be modulated in ways that add a high degree of electronic security, i. e., two-frequency carrier for constant amplitude, frequency modulation, speech inversion, and frequency shift keying. Reception is then impossible with such devices as audio receivers or infrared telescopes, and is possible only by the use of photosensitive devices coupled to the correct types of radio-frequency receivers. The threshold of sensitivity is lowered with respect to audio systems because parasites and interferences of any but the correct type of radiation are without effect. Increased reliability and range of operation are obtained and the whole system is extremely difficult to jam. With complete secrecy it permits the use of recognizing signals, general frequency calls, true duplex (two way) or multiplex communications, and lock-in and following circuits for exact remote control of the optics without hunting because it makes possible transmission of several different frequencies segregated in different cross sectional portions of a single beam.

With excitation of the tube at frequencies above 50 megacycles, shifts in the oscillator's frequency are accompanied by small shifts in the position of the enhanced bands of radiation along the spectrum. Large changes in radio frequency, e. g., from 60 mc. to 100 mc., cause the enhancing of spectral lines to occur at a different part of the spectrum. This shift is especially noticeable in the infrared spectrum when xenon gas is used, and this phenomenon makes it possible to readjust a band of light radiation to a required frequency band or to achieve a modulation system by shifting a band of light.

The present application is directed particularly to certain features disclosed and claimed in the parent application, Serial No. 645,626, Patent No. 2,538,062 issued January 16, 1951. These features are concerned particularly, in a light communication system, in maintaining a constant light output in order to avoid enemy detection and jamming during communication of intelligence, thus maintaining secrecy of the signal from audio, aperiodic or resistance coupled receivers as well as for receivers not tuned on the operating frequency or frequencies. The system applies to any light radiation.

The present application includes different systems for maintaining a constant output of light radiation from the transmitting projector (or optic system) so that the amplitude of the radio frequency modulated light is constant, or so that the envelope of the output of light energy is kept at a constant level (straight line).

A system of control to keep a constant light output level is required in order to maintain automatically a precisely constant amplitude output of light radiation from the light radiator (gas tube or gas tubes). Adjustment of such devices is unnecessary, since adjustment is not critical, because of their stability. No feed back from the output need be used in such control. It is an important feature that the present constant intensity or amplitude system feeds the light source with a combination of radio frequency currents, the total amount of which, when measured with an R. F. ammeter, is constant (variations less than 1/1000). Radio frequency currents are used which are distinct either in intensity or in frequency or both, according to whichever of the systems as described below is used. Such total amount which can be measured in the circuit of utilization (i. e., one or more gas tubes) remains constant during modulation or keying due to the circuit in use (self control). As a result it is possible to maintain secrecy except for receivers especially designed for the communication system involved.

If the output of light is not of constant amplitude, secrecy is not maintained because there is an envelope of the light modulation which can be detected by ordinary receivers.

In my constant amplitude output system, only a portion of the constant light output has to reach and act upon the respective receivers of the corresponding receiving stations, and these receivers are not affected by any light radiation which is merely of the same light frequency. The detecting system is insensible to light, even if it be of the same light frequency, if the light is not radio modulated at the correct frequency (or frequencies) according to the transmitting characteristics of the radio modulation. Thus only light receivers definitely designed, as taught herein to perform the reception of part of said constant light output, will receive and utilize the transmitted light.

My invention includes the constant amplitude output system of light radiation whereby secrecy is maintained for classical audio, aperiodic or resistance coupled light receivers and for receivers not tuned on the working radio frequency (or frequencies) of modulaiton of the light.

The different systems disclosed in the present application for obtaining such constant light output are the following:

(1) A double carrier system with variation in the relative percentage of each, and useful particularly in telegraphy and telephony.

(2) A double carrier system, the modulation being 180 degrees out of phase (in audio frequency), and also particularly useful in telegraphy and in telephony. This can be considered as a particular case of the system 1.

(3) A double carrier system for telegraphy jumping from one frequency to another. This can be considered as a particular case of system 2.

(4) A system using frequency modulation of infrared radiation.

(5) A system utilizing a frequency shift keyer which shifts the radio frequency between two frequencies and requires a frequency shift converter at the receiving end. Such system is used in telegraphy only and is somewhat analogous to frequency modulation.

(6) A system of modulation of the light output causing shifting of the spectral band (light frequencies). This is particularly useful in telegraphy and telephony.

In the systems 1 to 5, inclusive, the concept is independent of the type of transmitting tube and the type of tube excitation, it being unnecessary to enhance or modify the tube's radiation spectrum. These five different systems of modulation which maintain a constant light output are absolutely general and independent of the quality of the light radiation and gas tube, that is, they do not depend on any particular type of gas tube or light radiation.

Systems 1 to 5 with constant light output can work with gas tubes not solely excited in radio frequency and with gas tubes having more than two electrodes or no electrodes. The number of electrodes, the modification of the spectrum, the efficiency of the gas tube, and the quality of the radiation are not involved in these five systems of modulation, but only the constant light output which protects against fear from enemy detection (interception) and jamming.

In system 6, on the contrary, the constant output is obtained by a variation of the spectrum which corresponds to a special excitation and to the utilization of very specific radio frequencies of excitation of the gas tube, which frequencies depend upon the gas type and pressure, and also upon the tube itself.

In each of the above systems, special conditions (ratings) or requirements (balancing settings) in combination with certain circuits or dispositions are necessary for maintaining the light output constant during modulation.

It is therefore an object of this invention to provide a system of radiation transmission that has markedly better performance and is capable of much greater security and reliability.

It is another object of this invention to provide a light source excited by radio-frequency current, in which the radio-frequency is modulated in one of several methods of modulation which take advantage of electronic circuits to achieve new levels of security and reliability in modulated light communication while, at the same time, making jamming very difficult. These circuits include class C operation, two-frequency constant amplitude telegraphy and telephony, frequency shift keying, and frequency modulation of the radio-frequency generator.

It is another object of this invention to provide a light source excited by one or more radio frequency currents in such a way that the radiation band of light can be shifted.

With the above objectives in view, reference is made to the drawings which are merely illustrative of a preferred embodiment of this invention, showing a schematic arrangement for accomplishment of "blackout" transmission.

In the drawing:

Fig. 2 is a view of a conventional gas discharge tube.

Fig. 3 is a view of another conventional gas discharge tube.

Fig. 4 is a front view of a non-inductive configuration for a gas discharge tube used in the system of Fig. 1.

Fig. 5 is a side view of the tube of Fig. 4.

Fig. 6 is a front view of an inductive configuration for a gas discharge tube for use in the system of Fig. 1.

Fig. 7 is a side view of the tube of Fig. 6.

Fig. 8 illustrates an inductive configuration of several coils of the type shown in Fig. 7 housed in a glass envelope of special design.

Fig. 9 is a schematic diagram of a starting circuit with a relay for switching to operating position.

Fig. 10 is a schematic diagram of another starting circuit which depends on a mismatched quarter-wave line to get breakdown voltage.

Figures 12, 12A:
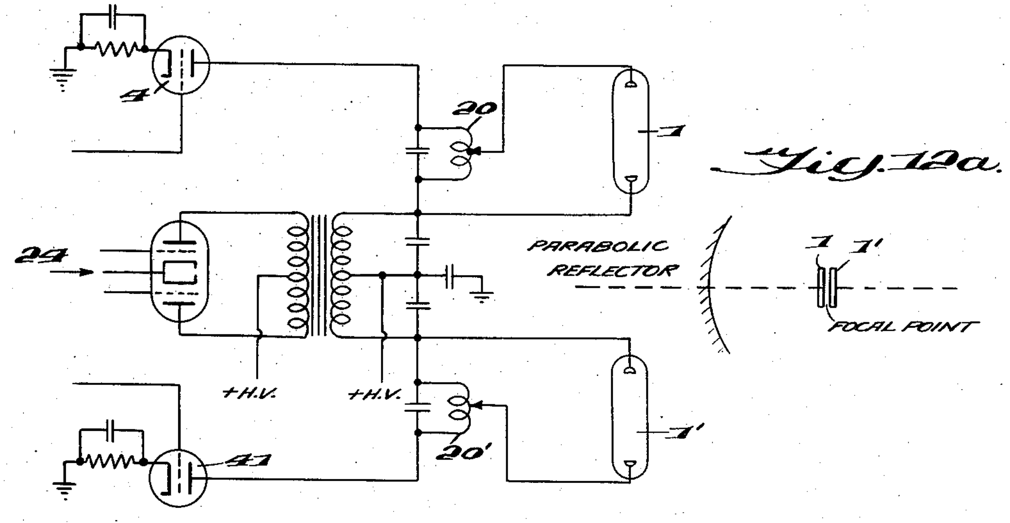
Fig. 12 is a schematic diagram of the two-frequency exciter, where two radio-frequency amplifiers are modulated so as to maintain constant light output from overall system.

Fig. 12*a* is a diagrammatic view of an arrangement for two gas tubes suitable for use with a circuit such as that shown in Fig. 12.

Figure 13:
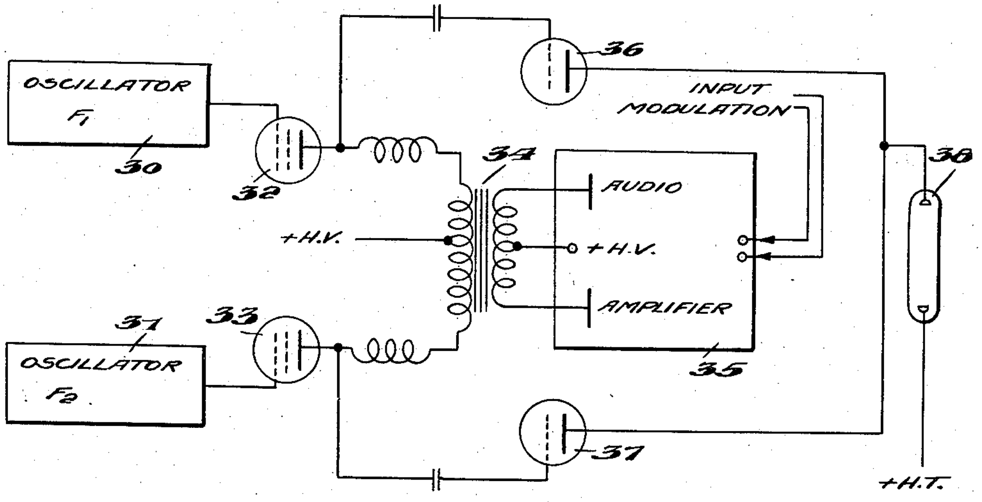

Fig. 13 is another schematic diagram of a constant amplitude infrared output system for transmission of telephony utilizing two radio-frequency oscillators tuned to different frequencies and exciting a single tube.

Figure 14:
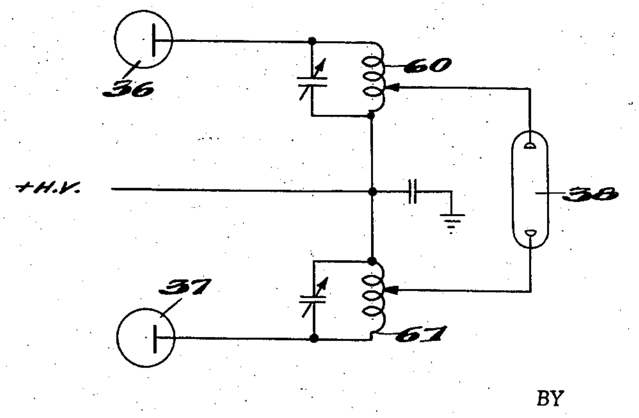

Fig. 14 is a schematic diagram of a constant amplitude transmitter similar to that shown in Fig. 13, but showing the outputs of the two power stages exciting the tube through two tank circuits.

Figure 15:
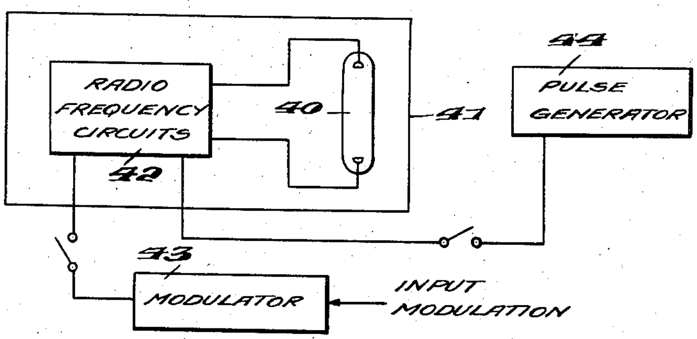

Fig. 15 is a schematic diagram of a gas tube exciter in which the gas tube is a part of the oscillator. Such a system is particularly useful for pulse operation or for shifting the band of radiation.

Figure 16:
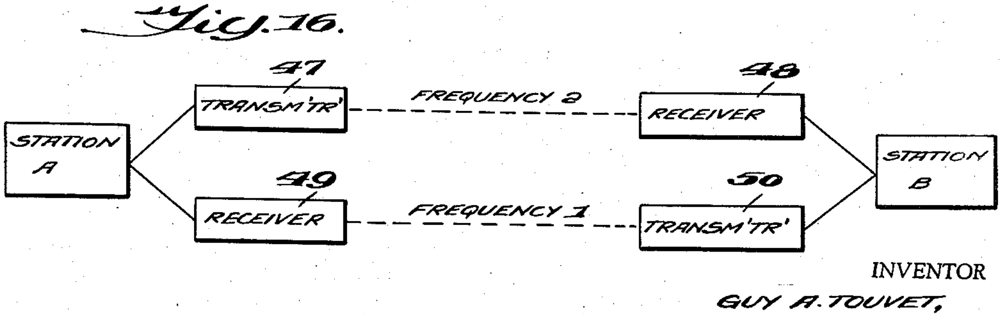

Fig. 16 is a schematic diagram for a two-way (duplex) communication system.

Figure 17:
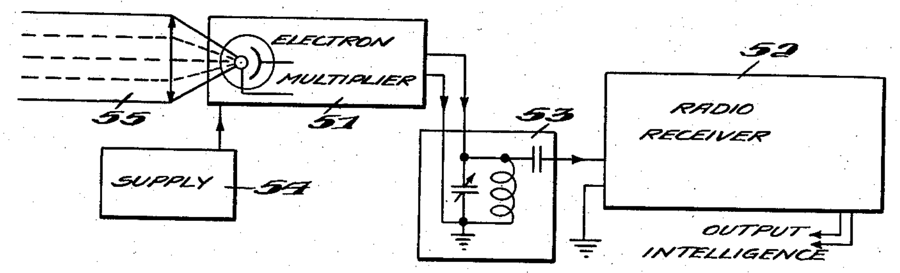

Fig. 17 is a schematic diagram of a light communication receiver including an electron multiplier and its coupling to a radio-frequency receiver.

Figure 18:
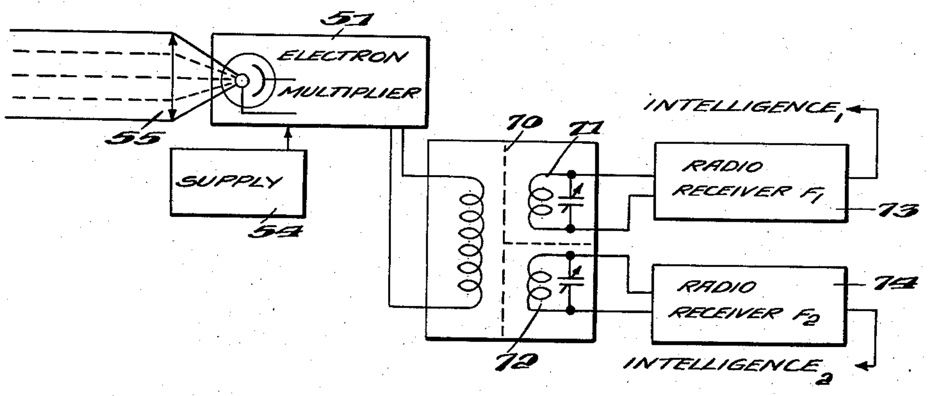

Fig. 18 shows another form which the coupling and receiver shown schematically in Fig. 17 may take, the coupling comprising a R. F. transformer having a plurality of secondary coils, each of which feeds a separate receiver.

Figure 19:
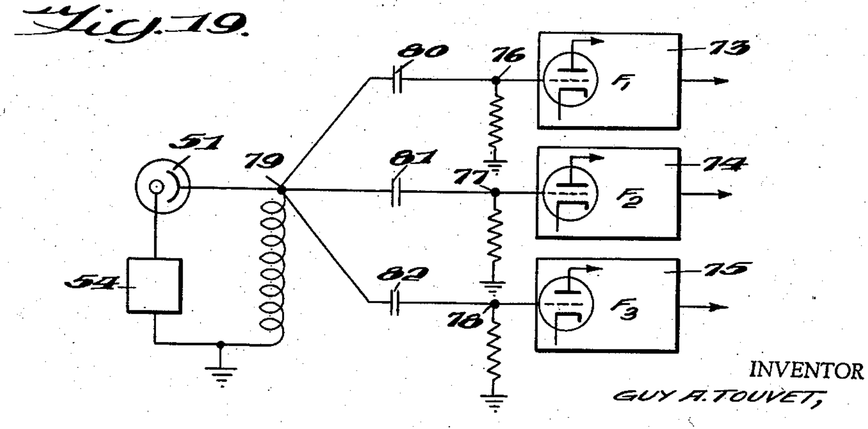

Fig. 19 shows another form of coupling to a number of separate receivers.

Figure 1:
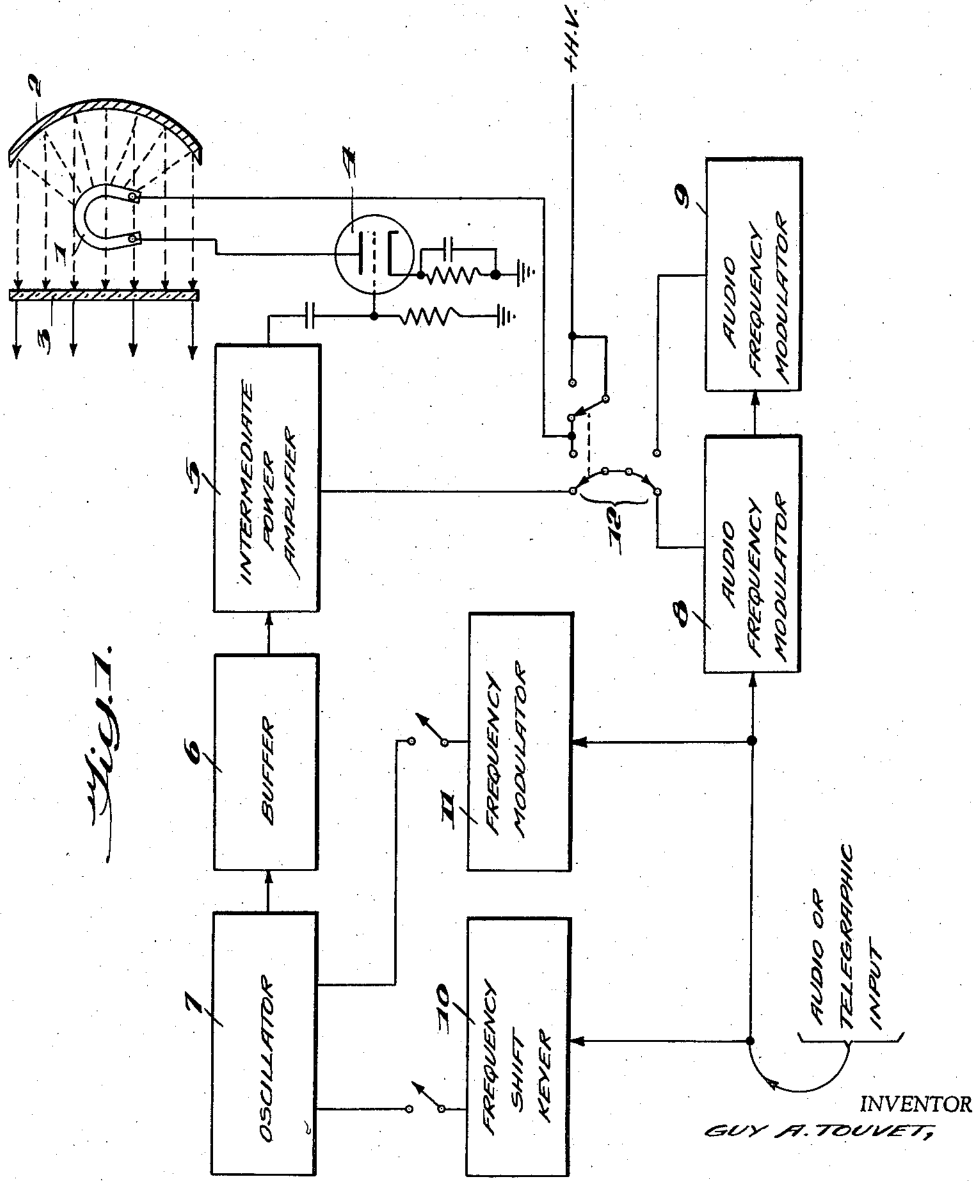
Fig. 1 is a schematic diagram of a light source and excitation system therefor.

In Fig. 1, the gas tube 1 containing a rare gas such as xenon at low pressure, for example, in the order of 3 to 60 mm. of mercury, is mounted at the focal point of mirror 2; and its radiant energy output enters filter 3 which passes only infrared radiation. Tube 1 is the plate load for power amplifier 4 which generally must have an extremely low internal resistance sometimes as low as 50 ohms. Tube 1 obtains its excitation current therefrom. Intermediate power amplifier 5, buffer 6, and oscillator 7 provide stable driving power at the desired voltage and frequency. Modulator 8 is used when the R. F. is to be audio modulated. Modulator 9 is used when the R. F. is modulated by a second R. F. This modulation system can be applied to either the intermediate power amplifier or the power amplifier to vary its output and so impress the audio or telegraphic voltage on the carrier.

Transfer switch 12 accomplishes the above connections as desired.

If frequency shift keying is used, the frequency shift keyer 10 is connected according to known art.

If frequency modulation is used, the frequency modulator 11 is connected according to known art.

In Fig. 2, tube 13 represents the simplest known form of gas discharge tube.

In Fig. 3, tube 14 still uses but a single passage of the tube, but folds the ends back so as to keep connectors and mounting close together.

In Fig. 4, tube 15 is folded compactly upon itself in successive layers to multiply the light emanating from a small area source over that which a single tube would give for the same current density. It has a very small self-inductance for a relatively long length of tube.

In Fig. 6, tube 16 is wound helically into a flat coil to accomplish the same concentration of light, and also to have self inductance which as later appears may be utilized to advantage. Several of these coils may be stacked on each other to multiply the effect.

In Fig. 8, tube 17 is one of the compactly folded tubes, mounted inside an envelope. The tube opens at one end into the envelope which is at the low gas pressure. The electrical path is from one electrode, through the tube, to the other electrode, mounted in the envelope. Part of the gas in the envelope is excited by induction.

In each of Figs. 4 to 8, plane of coil is normal to axis of propagation.

In Fig. 9, the gas tube 1 is shunted by an impedance or a resonant circuit 18 through the contacts of relay 19. The coil of relay 19 is in series with the tube and the high voltage supply. When the tube 1 does break down heavy current flows through relay 19, the contacts are opened and the tube is left unshunted.

In Fig. 10, the gas tube 1 is at the end of a quarter-wave section of transmission line 21. The transmission line is inductively coupled to tank circuit 20 of power amplifier 4. When the tube is not conducting, the quarter-wave section line is effectively "open ended" and has a high voltage at the tube. When this voltage breaks the tube down, an approximate match of impedances occurs and the standing wave is substantially reduced.

Figure 11:
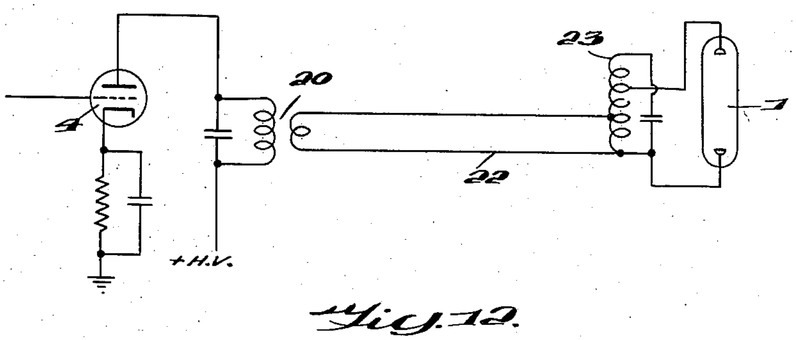
Fig. 11 is a schematic diagram of another starting circuit where a coaxial line is coupled from the amplifier to a remote tank circuit across which the gas tube is connected.

In Fig. 11, a tank circuit 23 is at the end of a long length of coaxial line 22 with the gas tube 1 connected across it. When the tube is not conducting, the tank circuit 23 has a high voltage across it due to energy transferring from amplifier 4. The gas tube is connected across the tank at points where an impedance match is approximated, once the gas tube breaks down, i. e., carries current.

In Fig. 12, two radio-frequency oscillators 4 and $4^1$ are tuned to respectively different frequencies and modulated by audio amplifier 24 so that the total light output from tubes 1 and $1^1$ is of constant intensity. Thus, any conventional audio receiver would not receive the intelligence contained in the modulation.

In Fig. 13, two radio-frequency oscillators 30 and 31 are tuned to different frequencies and the two radio frequency outputs are modulated at 32 and 33, 180 degrees out of phase with respect to each other by a center tap transformer 34 connected to the output of an audio amplifier 35. Modulated stages 32 and 33 supply the excitation to two power stages 36 and 37, the plates of which are connected to one electrode of a gas tube 38, the other electrode being connected to high tension. When correctly balanced this also provides telephony with substantially constant amplitude infrared output.

In Fig. 14 is shown a constant amplitude transmitter similar to that shown in Fig. 13 but showing the output of the power stages 36 and 37 exciting tube 38 through two tank circuits 60 and 61.

In Fig. 15 is shown the use of a rare gas filled tube 40 forming a part of a radio frequency oscillator 41 in conjunction with the necessary radio-frequency circuits 42. Modulator 43 is used when the light radiation is to be modulated. Pulse generator 44 is used when pulse operation is desired to control the oscillator circuit 42 and tube 40 which produce the corresponding light pulses. In such a circuit, the tube, instead of being driven by a forced radio-frequency oscillation, actually itself comprises part of the oscillating circuit.

Fig. 16 represents a two way (duplex) light communication system between station A and station B. Transmitter 47 and receiver 48 constitute one channel, transmitter 49 and receiver 50 another channel. Each of these channels works on a different combination of frequencies so station A and station B can transmit and receive simultaneously.

In Fig. 17 a photosensitive device 51 which includes an electron multiplier is coupled to a radio-frequency receiver 52 of high amplification factor by means of a tank circuit 53 so as to excite the tuned circuit with the impulses received by the device 51. The numeral 55 is the optical system which concentrates the light on the photosensitive surface of 51, and 54 is the power supply for multiplier 51.

In Fig. 18 the tuned circuit and R. F. receiver of Fig. 17 are replaced b yan R. F. transformer 70 having two secondary coils 71 and 72 feeding respectively receivers 73 and 74 at different frequencies.

In Fig. 19, the tuned circuit 53 and receiver 52 of Fig. 17 are replaced by inductance 79, coupling capacitors 80, 81 and 82, and inputs 76, 77, and 78 to receivers for various radio-frequencies.

The gas discharge tube was filled with xenon gas because it is much richer in infrared output than the other rare gases when excited with radio-frequency current. This xenon-filled tube was mounted in an optical system which can be filtered to pass infrared substantially to the exclusion of other radiation, and would concentrate its radiant output into a beam. The other rare gases can be used as desired, in place of the xenon; and the optical system can be unfiltered to use any radiation in the spectrum or filtered to select any band from ultra-violet to infrared where the increase in amplitude and broadening of spectral lines into bands occurs. The electronic system for exciting this gas tube was a radio-frequency generator capable of modulation by several methods.

When this R. F. excitation is applied in place of the conventional D.-C. audio, several significant changes occur which this invention utilizes to secure marked improvements in a light communication or radar system and other applications such as remote control. These changes are:

(*a*) As compared with other forms of excitation and for the same excitation power, a particular portion of the rare gas' spectrum shows a large increase in radiant output, apparently due to a redistribution of energy along the spectrum and to the excitation of new lines of the spectrum. This effect is especially evident with xenon gas, with which gas it occurs predominantly in the infrared region. Only a small percentage of visible light is produced and the filtering is easy to obtain for visual secrecy. As this xenon tube permits a fluent modulation of infrared at radio-frequency it therefore presents all the advantages inherent in the use of this type of excitation.

(*b*) The radiation occurs in broad bands rather than sharp lines, possibly due to forced oscillation-excitation of the rare gas.

Because of the amplified and broadened emission, more power is allowed without overloading and distortion. This distortion would appear when using less power if one single ray of the spectrum were used because its intensity would necessarily have to be extremely great to get the same light output as is obtained with a band of light which permits localization of a large quantity of energy. Thus the tube can utilize higher tube current intensities and emit greater light output without distortion than are obtainable with conventional excitation which give the spectrum of lines characteristic of the element used rather than broad bands.

(*c*) Because of R. F. current distribution in a conductor, much higher current densities can be used for a given current to the tube than are obtainable with D.-C., without damage to the tube or distortion of the modulation, which results in greater power and light output.

(*d*) The frequency, intensity, pressure of the gas, the wave form of the exciting current and the shape of the tube are the principal factors which control the transition from the characteristic radiation line spectrum of the element used to the forced radiation broad band spectrum.

High current peaks of short duration are particularly favorable to the development of the spectral rays of the xenon for example. Current densities of 100 amperes per square centimeter can be obtained and usefully employed, a feature which is highly important for certain applications requiring high intensity pulses such as range finders and infrared radar. With xenon gas particularly, a great intensity of light has been obtained during very short pulses of radio frequency currents, for example, approximately ten kilowatts of instantaneous power with a pulse of one microsecond, Fig. 15. Even higher ratings can be reached. The small fraction of light which is reflected by an obstacle can be sufficient to allow reception and can be distinguished from any other signal as a result of the use of radio-frequency excitation. Thus, infrared radar operation becomes possible. While it is not capable of such a range as ordinary radar, it has a high degree of secrecy and reliability and is very difficult to jam.

Such pulses of light can help to solve numerous problems particularly in television, low altitude altimeters, range finders and remote control by means of an infrared beam.

(*e*) The electronic circuits of the R. F. amplifier are capable of operation in class B, class C, or pulsed output to obtain high peak currents for short portions of each cycle. When the xenon tube is driven in class C or pulses, the infrared output increases several times more than would be expected from the current change which occurred when the power amplifier was driven to this class of operation. The widening of the xenon spectrum from lines to bands is even more pronounced with this excitation. In one test, driving a bank of paralleled triodes into class C operation increased plate current from 0.850 to 1.150 amperes, a current increase of about 35%, whereas the infrared output increased 2.3 times. Modulation was essentially linear, just as with class B or class A. In other words, the modulation peaks are increased and the output efficiency of the luminous emission is improved.

(*f*) Radio-frequency excitation permits the use of very simple starting circuits, Fig. 9. Additional reactances or tuned circuits as appropriate to obtain the required radio-frequency breakdown voltage can be connected across the gas tube and may be cut out if necessary by a relay which may conveniently be in one of the D.-C. supply leads of the radio-frequency source. Once the gas tube breaks down, the variation of load causes a variation of direct current and operates the relay. Generally, R. F. excitation and high voltage are interlocked by a relay in a modulated stage cathode. When discharge of the gas tube stops, the entire device returns automatically to the initial condition ready to begin operation again, thus avoiding any manual operation and constituting a protective feature for the equipment. On transmission lines, the mismatch of a cold gas tube can be used to get high voltage standing waves which decrease or disappear when the tube breaks down and becomes matched to the line, Fig. 10. A tuned "tank" circuit may be connected to the end of a long length of line and the tube shunted across all or a portion of this tank as appropriate to get breakdown. Approximate impedance match then occurs with breakdown, Fig. 11.

(g) Within the radio-frequency generator, various forms of modulation can be applied. Audio-frequencies, or telegraphic impulses can be applied as modulation in any of the low power buffers or intermediate power amplifiers so long as the power amplifier is operating as a linear stage. Class C or pulsed operation of the power amplifier requires a high level modulator. For greater security two frequency modulation can be used, where the secrecy of the signals is maintained because the apparent intensity of the light source remains constant. This is accomplished by variation of the radio frequency which modulates the light without changing the value of the current feeding the discharge tube. The two radio-frequency voltages are modulated by the audio or telegraphic voltage so their total amplitude is constant and this R. F. combination then excites the gas tube. This constant amplitude modulation is not detectable on a conventional receiver consisting of photocell and audio amplifier or with devices which do not receive radio-frequency such as IR telescopes, or by the human eye. The signals can be detected only by receivers tuning to one or the other of the chosen frequencies.

For telegraphy the most simple modulation is by alternately transmitting two frequencies so that they correspond to telegraphic signals or spaces while the current exciting the gas tube remains constant.

For telephony, the result can be obtained by varying only the relative percentages of the two radio-frequency currents in the discharge tube while their total remains constant. One way to achieve this is by modulating the two radio-frequencies with an audio modulation 180 degrees out of phase relative to each other, as by use of a center tap modulation transformer, Fig. 13. This is an amplitude modulation system.

The same degree of secrecy is obtainable with frequency shift keying and frequency modulation which are connected to the oscillator circuit, if used, as they act on the oscillator. Double frequency, frequency modulation, and frequency shift keying offer electronic security from reception on anything but the right kind of receiver, and at the same time the system excludes other signals or parasitics.

In the opening portion of this specification, six systems for achieving security against jamming and undesired interception were discussed. These will now be described in greater detail.

In system 1 involving two carriers, there are two radio-frequency sources and it is sufficient to modulate in audio frequency the relative percentage of the two outputs of said radio-frequency sources, then to mix them in the light source, but special conditions are necessary to maintain constant in the gas tube the total amount of the two radio-frequency currents (their relative percentage being varied by the modulation in audio frequency), and thereby to maintain the output of light constant during modulation. Such conditions are:

(i) A modulator (audio frequency amplifier) controlling or modulating the two radio frequency sources with a determined number of degrees out of phase (in audio frequency).

(ii) Two modulators, the phase of each of which is controlled, and each modulating one of the two radio frequency sources. This includes electrical connection in between the two modulators providing control of the phase of their respective outputs.

(iii) A control of the amplitude of the two carriers (R. F. sources) such that the amplitude of their total modulated output remains constant. Generally, not only the amplitude of each carrier is involved, but the percentage of modulation of each.

Such are the means to vary at telephonic audio frequency the relative percentage of two radio-frequency currents in a gas tube while maintaining their total current absolutely constant.

System 2 is the same as system 1 but the audio modulation of the two sources is 180 degrees out of phase. The control is very easy in this case, a center tap transformer being used for the modulation as indicated in Figs. 12, 13 and 14. The output amplitude of each radio-frequency source has to be identical as well as the percentage of modulation. In practice, adjustments are necessary to balance the outputs and means are provided to control the R. F. outputs of each of said radio-frequency sources and to maintain absolutely constant light output when both R. F. sources are connected to feed the gas tube. The secrecy is maintained for receivers not designed to receive such constant light output by tuning on one of the main radio-frequencies or their harmonics so that the radiation from such transmitter can only be received with intelligence by correctly designed receivers.

Several different gas tubes can be used at once instead of only one (see Fig. 12), said tubes being disposed one in front of the other at the focus of an optical projector as shown in Fig. 12*a*. Each tube is then excited with one of the above mentioned carriers (R. F. source). The respective light outputs of said tubes are adjusted so as to maintain substantially constant amplitude of the total light output from the projector. As above, intelligence can only be received by a properly designed class of receivers.

With respect to systems 1 and 2, no feedback from the output is needed to keep the output constant, but only a control of the phase of the audio frequency of modulation, a control of the percentage of modulation, and a control of the amplitude of the carriers. In the systems to which this application is directed, there is no "phase modulation," that is, variations of phase of two radio-frequency vectors (of the same radio frequency) due to modulation. The invention uses amplitude modulation of two radio-frequency carriers (R. F. sources), only the audio modulation being permanently a certain number of degrees out of phase (for example 180 degrees as in system 2). There are used in the present invention two radio-frequency sources, the phase of which is not important, since each is of a distinct frequency. The two R. F. sources have to be modulated out of phase while maintaining the output of R. F. energy constant, that is, the sum of R. F. energies of the different frequencies is kept at a constant level. Such constant radio-frequency energy output is totally unrelated to radio communications.

The utilization of several gas tubes disposed one in front of the other utilizes the transparency of a gas for its own radiation as discussed elsewhere herein for the case where the gas filling the tubes is the same in each tube. The tubes can be filled with different gases, with the color of the output varying with the modulation, even if of constant level.

System 3 can be considered as system 2 working in telegraphy. It uses two radio-frequency sources of the same amplitude but of distinct frequency. The signal jumps from one frequency to the other with the output remaining constant.

System 4 uses frequency modulation affecting the radio-frequency currents feeding the gas tube. Output amplitude of light is constant but the correct receiver adapted to frequency modulation is necessary.

If the band of modulation in radio frequency is well outside of certain values of radio-frequencies, and if certain minimum peak intensities are not attained as explained elsewhere herein, there will be radio-frequency modulation of the light output. If as explained, the conditions for modulation by spectral distribution are not attained, the light frequencies of radiation will remain substantially constant as will the amplitude of radiation. But even where conditions for varying the spectrum are not fulfilled, radio-frequency modulation of the light is attained with this system as well as constant amplitude of light output, and protection against jamming and enemy interception are attained. If the conditions which effect the spectrum shift are fulfilled, system 6 is utilized.

System 5 uses a frequency shift keyer which shifts the radio-frequency of excitation from one frequency to another according to a predetermined combination. Such frequency shift keyer does not entail obligatorily a constant level output of radio-frequency, but in the practice of the present invention, the output of the radio-frequency exciter is controlled so to be constant. This can be accomplished in the frequency shift keyer itself by using a voltage limiter. If there is no need for using constant output, the frequency shift keyer need not be of constant amplitude output. Then the signal can be received by any audio frequency light receiver (resistance coupled for example) and can be intercepted even though the key or combination of the signal may not be known and no intelligence can be obtained from the signal received.

Advantage of the constant output system will be easily understood but it is only part of the security of a system such as system 5. The frequency shift system is quite useful, and a frequency shift converter is necessary at the receiving end to change the frequency shifts into conventional telegraphic impulses.

In system 6 modulation varies the radio-frequency of the excitation source, and as a result, and due to choice of the radio-frequency values as well as of the peak intensity, shifts of the spectral band of light are obtained according to the frequency of excitation and modulation of the shift of the spectral band is obtained. Thus, this system uses the shifts of the light radiation frequencies of a gas tube occurring when there are certain variations in the radio-frequency of excitation of said gas tube.

The radio-frequency modulated spectral output does not vary substantially in intensity with changes in the excitation frequency, but it varies in light wave length of the output of the transmitting source. This effect appears only for certain values of radio-frequency as is mentioned elsewhere herein, and it is comparable to a resonance effect. This system is not concerned with variations in intensity with changes in the excitation frequency, but with changes in light frequency according to changes in the excitation frequency for certain values of radio-frequency.

This system can be compared to a frequency modulated radio-frequency source exciting a gas tube and modifying its spectral output. It is to be noted that such spectral output remains radio-frequency modulated. However, the reception of such a signal can be carried out with a band filter in front of an ordinary light receiver not necessarily adapted to the radio-frequency modulation, or, if desired, with a receiver as in system 4, utilizing frequency modulation.

If desired, the change in color of the tube can be compensated by a second identical tube disposed in front of the main one and excited in such a manner that the total light output is of substantially constant amplitude and color. The radio-frequency modulation will be chosen so as to shift the band of radiation of the first tube in one direction and another modulation frequency for the second tube will be chosen so as to shift the band of radiation of the second tube in the opposite direction. The two bands of light can overlap in part and a substantial compensation is obtained in respect with variation in color. As there are two channels, transmission of intelligence is carried out on either one or the other. It is to be noted that the values of said modulation frequencies are quite close to each other. It is comparable to a resonance curve, choosing one setting on one side of the maximum and the other setting on the other side of said maximum. If the two settings are more distant than 10,000 cycles, intelligence can be transmitted. The modulator can vary each radio-frequency exciter 180 degrees out of phase in a similar manner as in system 2.

The reception will be carried out in this case with or without a band filter in front of a light receiver but the receiver must necessarily be adapted to one of the radio-frequency modulation.

The effect of shifting of the spectral band produced by a gas tube and utilization as a means of modulation for transmission of intelligence is disclosed elsewhere herein. This system may be considered as a particular case of system 4.

(*h*) A receiver for this radiation would have an optical system, a light filter, if desired, to exclude extraneous radiation, and a photosensitive cell, with the cell's electrical output going to a radio receiver capable of utilizing the type of R. F. excitation and modulation which were imposed on the light. When using class C R. F. excitation of the gas tube, the sine wave is preferably restored at the reception end by means of a convenient coupling circuit, such as shown in Fig. 17, previous to feeding the signal to the R. F. receiver.

Coupling circuits utilizing pure inductance permit coupling of one cell to different receivers tuned to different frequencies for simultaneous reception of different signals through a single phototube (Fig. 19). Such a system is useful in following circuits for remote control of optics where several frequencies segregated in different portions of a single light beam are used. However, the coupling between the cell and receiver is preferably achieved in such a way as to avoid any appreciable ohmic resistance in the output circuit of the cell or photosensitive element. In this way, effects of luminous parasitics and interferences are practically eliminated. Maximum sensitivity, selectivity and efficiency are obtained for the radio-frequency of excitation of the light and jamming of any kind prevented. The cell can conveniently be one which incorporates an electron multiplier. The use of such multipliers for weak signals is extremely easy and efficient with this type of R. F. excitation because light interferences, regardless of their nature, do not affect the output circuit. In such devices the multiplier can be advantageously combined with a radio receiver of a high amplification factor.

Such use of electron multipliers would be impossible with audio frequency amplifiers due to parasitics or interferences which always occur, however weak they may be, because the unwanted signals are amplified along with the signal to be utilized.

If necessary, larger optical systems can be effectively employed for reception purposes without adding to the difficulties which occur at audio frequency methods in which the parasitics or interfering signals are increased at the same time, particularly in fog when light is scattered.

The radio receiver can be a tuned-radio-frequency amplifier with detector and amplifier, a simple superheterodyne receiver, a "double I. F." superheterodyne receiver, or a special receiver with F. M. limiter stages and discriminators or a regenerative or super-regenerative receiver. The various receivers are well known to electronic engineering, and give, in combination with the photosensitive element, an overall system sensitivity much higher than the audio modulated system. In other words, the threshold of sensitivity is lowered as compared to audio frequency method and the lowering of the noise level without lowering the amplification of the signal results in increased discrimination and identification.

Numerous applications of the above are contemplated, for instance, use as a recognition signal to identify light transmitters such as I. F. F., use in producing a general call frequency, use by assigning special frequencies to different vessels, use in true duplex and multiplex communications, and use in remote control of optics such as in lock-in and following circuits.

A true duplex system of light communication Fig. 16 is difficult to obtain with the use of audio frequency reception methods as there is fed back between transmitter and receiver at one end of the link due to the scattering of the light. In order to prevent oscillation it is necessary to reduce the amplification of the audio receiver and, therewith, the range, or to interrupt transmission in order to receive. The use of radio-frequency excitation to produce and receive the radiations permits, on the other hand, continuous (true) duplex operation with full sensitivity and maximum range because as in ordinary true duplex radio, simultaneous transmission and reception can be carried on at two different frequencies.

An efficient automatic lock-in and following system for the remote control of the optics of the equipment can be achieved simultaneously with the transmission of the signals (key or phone). The "lock-in" signal is a frequency superimposed as by "double modulation" on the constant amplitude radio-frequency currents which feed the tube. It is sent on the same beam and helps the lock-in of the rotative optics to obtain the first contact between transmitter and receiver. The "following" signal informs the receiver of its particular position in the beam, because it is possible to cause the separation of different frequencies in the different parts of the beam cross section. (Receiver Fig. 18.) So with the exact corrections necessary, continuous contact is achieved through automatic aiming of the transmitter and receivers.

A system of the type just described is described and illustrated in complete detail in my co-pending application, Serial No. 682,957, filed July 14, 1946. Further description thereof is not believed necessary in this application since reference may readily be had to the co-pending case.

(*i*) A marked improvement in the gas discharge tube is achieved by folding the tube upon itself into a compact plane of the desired area, and piling several of these sections up until the necessary tube length is achieved (see Figs. 4 and 5). The light from the various portions of the tube then becomes additive and is useful optically because such a source approximates a point source which can be focused, etc., efficiently and yet has the desired area for beam width. Such a tube can provide whatever distribution of light in the beam is required, the cross section of the beam being the image of the gas tube, which is at the focus plane.

Because the light is emitted in broad bands of the light spectrum, very little of it is absorbed as it passes through the gas in overlapping portions of the tube.

The tube folded in a non-inductive way presents a very small inductance for a relatively long length of tube, such an embodiment being useful at high radio-frequencies.

A known impedance in radio-frequency can be obtained by forming the tube as a helix or a coil (Figs. 6 and 7) so that it possesses a self-inductance when used electrically. This self-inductance is useful in resonant circuits, a special "tank" circuit being formed by the gas-circuit itself in spite of the negative characteristic of the tube.

The tube can be part of the power amplifier's "tank" circuit, or it can oscillate by itself, using this negative resistance characteristic (Fig. 15). Such tubes can be housed in an envelope at low gas pressure, the gas inside the envelope being excited by induction with increased efficiency of light output (Fig. 8).

The tube may also comprise several successive spirals arranged continuously or may have the shape of concentric screws.

(*j*) At radio frequencies greater than 50 mc., a shift in the frequency of the R. F. generator causes a shift in the band of radiation to a slightly different wave length. A major change into radio frequency, such as a change from 60 mc., to 100 mc., causes the redistributed energy to emphasize a band of radiation in another part of the spectrum.

By employing a variable oscillator at a very high radio-frequency for excitation, it is possible to obtain a desired displacement of the frequency band of the light emission by one or more of the following: (1) by causing certain spectral rays to appear; (2) by increasing the amplitude of particular spectral rays; (3) by broadening a spectral line to the right and/or left so that it becomes a band in that spectral region.

The intensity and position of the spectral band which is obtained depends on the frequency of oscillation, and this band can be somewhat displaced if desired by broadening a given spectral line to one side or the other. In other words, choice of frequency can enhance certain spectral lines in preference to others. Other factors also play a part, the exact details of the light wave length of radiation and widths of the bands varying, for instance, with the shape of the tube, the pressure of the gas and the density of the exciting current in the tube.

It is then possible to adjust the band of radiation of the gas tube within certain limits by means of a variable U. H. F. excitation and, if desired, to achieve the communication on another frequency carrier (double modulation). It is also possible to achieve a class of modulation by shifting the band of light with a variable frequency oscillator in accordance with the modulation.

(*k*) When such an R. F. generator with an audio modulator drives a light source having some lag or inertia such as an incandescent lamp, it is noted that the light will follow the modulation to a much higher frequency than if it is excited directly with the modulation voltage. This is considered due to R. F. current distribution, which would have leave the center of the conductor with little current. This would cause more rapid cooling than if the lamp were directly modulated at audio frequency so the lamp could follow higher frequencies and, more important, the power output of audio modulated light could be increased for a given fidelity of modulation. A similar effect is noticed with gas tubes in that the radio frequency current is more intense about the periphery of the gaseous body of the source and there exists a core of unionized or less ionized gas. This distribution facilitates a more rapid ionization and deionization of the source than if it were directly modulated at the audio modulation frequency. On the other hand, radio-frequency excitation broadens the light emission into broad bands. This enables the tube, for the same audio output fidelity to be used with greater current densities and to carry a higher output of audio modulated light than it could without the use of radio-frequency excitation. For the same intelligibility more powerful audio modulated light can be obtained with this method than with other systems modulated only at audio frequency.

Taking into consideration merely the application of code and speech communication the following other advantages are noteworthy:

(1) First, for example, with this type of xenon tube and R. F. excitation, there is no limitation in power of the radiation to be produced, and improved efficiency is attained. Such a system is capable of emitting radiation running into kilowatts, if desired. Second, the threshold of sensitivity is lowered with respect to audio systems which corresponds to a signal to noise ratio increase. Consequently, the quantity of light which needs to be emitted to get the same results is smaller than with ordinary audio modulated light. Thus, the overall sensitivity of the system is markedly improved, making possible many different applications and resulting in greater security and reliability. As a consequence, the range in communications is only a question of line of sight, coefficient of transmission depending on the choice of the wave length of the light radiation; theoretically, the range is not limited except by line of sight and by the weight of the equipment.

(2) A considerable transmitting beam angle up to 35 degrees, afforded by the sensitivity of the system, renders possible the reception of communications from the transmitter, not only with one but with several receivers at the same time if desired.

(3) The large beam angle also results in a considerable degree of relative mobility of the transmitters and receivers.

(4) Transmission in the clear without the use of codes with the resulting speeding up of communications may be used with complete secrecy. This secrecy extends to invisibility; the complete absence of radio-electric irradiation into space; the freedom from interception by any but the correct type of receiver; and the type of the modulation system in use.

(5) The extreme difficulty in jamming this type of communication and the possibility of daylight operation with a correct filter in front of the photosensitive receiver, or without a filter if the photosensitive element has a light response corresponding to the radiation produced by the gas tube.

(6) The system can respond in particular to extremely slow variations of the amplitude of the radio-frequency carrier which make it possible to achieve an infrared barrier which would detect the presence of foreign objects. It would be more difficult to amplify signals of this type corresponding to slow variation of D. C. currents with an audio system, as changes in the order of fractions of a cycle per second would require a "D. C." amplifier.

(7) As a radio frequency is used as carrier the audio modulation introduces only the side band frequencies. The response of the transmitting tube and of the photosensitive receiver remain about the same for 10,000 cycles above or below the radio frequency carrier. As a result, in speech transmission the response depends mainly on the compensation and matching of impedance in the equipment. Perfect intelligibility is achieved. High speed code for the same reasons is possible. When this high speed code uses a two-frequency modulation, the current in the transmitting gas tube remains constant, and there is no delay in obtaining radiation which could happen if the tube was completely interrupted.

(8) The system is moreover characterized by its simplicity of operation, its simplicity of starting, and its stability and automatic operation. Since there are no moving parts, except the optics which are outdoors, the device can be enclosed in a water-proof cabinet for operation on board ships.

(9) Due to the special type of excitation of the gas tube it is possible to realize in light communication every combination which can be carried out with ordinary radio, the light beam being the equivalent of a conductor between transmitter and receiver so that the radio-frequency that is utilized is not radiated into space.

While much of the foregoing description has been drawn to infrared communication systems with an xenon filled gas tube as a radiating element, it is not desired to be strictly limited thereto since other types of gas or vapor filled tubes could be used; for example, helium, neon, krypton, argon and other elements that can be described as rare gases. Other radiation frequencies can also be used where desired. Certain metallic vapors may also be utilized as discussed above.

I claim:

1. A system for the emission of infrared radiation comprising a gas tube capable of having its light output modulated at radio frequency containing a gas selected from the group consisting of the rare gases, mercury vapor and caesium vapor, means for exciting said tube with radio frequency current to produce emission from the tube of infrared radiation, and means for modulating the frequency of said current with intelligence, and voltage limiting means for maintaining constant the voltage of said radio frequency exciting current to provide substantially constant output amplitude of infrared radiation.

2. A radiation transmitter comprising an optical projector, at least two gas tubes disposed one in front of the other at the focus of said optical projector, means for exciting each tube with a distinct radio frequency differing from exciting frequencies of the other tubes, means for modulating said exciting means, means to impose intelligence thereon and means for coordinating the respective light output of said tubes to maintain substantially constant the amplitude of the total light output from said projector, whereby said light radiation output from the projector and intelligence can only be received by correctly designed receivers.

3. A light communication system comprising a gas tube, means for exciting said tube at radio frequency, a frequency shift keyer which shifts said radio frequency between two frequencies, control means for securing a constant level of radio frequency excitation of said tube consisting of a voltage limiter included in said frequency shift keyer, a photo-sensitive receiver for detecting the radiation from said gas tube, a radio frequency receiver adapted to utilize the output of the photosensitive receiver and to amplify the frequency shifts, and a frequency shift converter adapted to change the frequency shifts into conventional types of intelligence transmitting impulses, said frequency shift converter consisting of tuned circuits having a frequency response corresponding to the frequency shifts whereby substantially constant amplitude of light radiation is maintained simultaneously with transmission of intelligence through the system without fear of enemy interception.

4. A light communication system comprising a transmitter including at least two light sources capable of modulation control and arranged to project light in the same direction, means including electrical energies susceptible of differentiation for controlling each of said sources, means for imposing a single audio frequency intelligence on the electrical energy for each of said sources, means for obscuring said intelligence by superposing one on each other the light from each of said different sources so that the total light output does not present an envelope of audio-modulation, a receiver including a light sensitive element for receiving light from said sources, means for discriminating and combining the electrical energies received by said element so as to obtain the intelligence.

5. A radiation transmitter comprising at least two gas tubes arranged to project light in the same direction, means for exciting each tube with a distinct radio frequency differing from exciting frequencies of the other tubes, means for modulating said exciting means, means to impose intelligence thereon and means for coordinating the respective light output of said tubes to maintain substantially constant with a straight line modulation envelope the amplitude of the total light output from the gas tubes whereby said combined light radiation output from the gas tubes and intelligence can only be received by correctly designed receivers.

6. A system for transmission of intelligence comprising a light source capable of being modulated at radio frequency, means for exciting said source simultaneously at different radio frequencies to provide a constant output level, said means consisting of two excitors of distinct radio frequency, said excitors being amplitude modulated by audio-frequency voltages 180° out of phase relative to each other, the amplitude of the single audio modulation being the same for each of said excitors as to maintain substantially constant straight line modulation envelope of the light output simultaneously with the transmission of intelligence, said light source consisting of a combination of two gas tubes connected separately to said respective excitors.

References Cited in the file of this patent

UNITED STATES PATENTS

| | | |
|---|---|---|
| 1,939,903 | Kayser | Dec. 19, 1933 |
| 2,032,588 | Miller | Mar. 3, 1936 |
| 2,121,829 | Seaman et al. | June 28, 1938 |
| 2,273,161 | Usselman | Feb. 17, 1947 |
| 2,461,456 | Usselman | Feb. 8, 1949 |
| 2,538,062 | Touvet | Jan. 16, 1951 |
| 2,557,974 | Kibler | June 26, 1951 |
| 2,562,887 | Beese | Aug. 7, 1951 |